United States Patent
Seng et al.

(10) Patent No.: US 7,209,304 B2
(45) Date of Patent: Apr. 24, 2007

(54) SYSTEMS, APPARATUS, AND METHODS TO DETERMINE THERMAL DECAY CHARACTERIZATION FROM AN EQUALIZED SIGNAL-TO-NOISE RATIO OF A MAGNETIC DISC DRIVE DEVICE

(75) Inventors: Edmun Chian Song Seng, Singapore (SG); UttHeng Kan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 421 days.

(21) Appl. No.: 10/172,515

(22) Filed: Jun. 14, 2002

(65) Prior Publication Data

US 2003/0016461 A1    Jan. 23, 2003

Related U.S. Application Data

(60) Provisional application No. 60/302,199, filed on Jun. 29, 2001.

(51) Int. Cl.
*G11B 5/02* (2006.01)

(52) U.S. Cl. ................. 360/25; 702/69; 360/31; 360/53; 360/66; 360/68; 360/69; 360/78.04; 360/78.06

(58) Field of Classification Search ............ 702/69; 360/25, 31, 53, 66, 68, 69, 78.04, 78.06
See application file for complete search history.

(56) References Cited

U.S. PATENT DOCUMENTS

| | | | |
|---|---|---|---|
| 4,905,102 A * | 2/1990 | Schulz .................. 360/46 |
| 5,555,279 A | 9/1996 | Nir et al. | |
| 5,721,816 A | 2/1998 | Kusbel et al. | |
| 5,754,353 A | 5/1998 | Behrens et al. | |
| 6,091,541 A | 7/2000 | Yoon | |
| 6,097,535 A | 8/2000 | Terahara | |
| 6,144,937 A | 11/2000 | Ali | |
| 6,185,175 B1 | 2/2001 | Zook | |
| 6,236,628 B1 | 5/2001 | Kim | |
| 6,338,148 B1 * | 1/2002 | Gillenwater et al. .......... 714/25 |
| 6,359,744 B1 * | 3/2002 | Mallary .................. 360/40 |
| 6,493,162 B1 * | 12/2002 | Fredrickson ............. 360/51 |
| 6,504,662 B2 * | 1/2003 | Sobey .................. 360/25 |
| 6,687,205 B1 | 2/2004 | Huber | |
| 6,775,521 B1 * | 8/2004 | Chen .................. 455/67.11 |
| 6,937,650 B2 * | 8/2005 | Coker et al. ............ 375/232 |
| 2002/0128787 A1 * | 9/2002 | Seng et al. .............. 702/69 |
| 2002/0186493 A1 * | 12/2002 | Yamamoto .............. 360/75 |

* cited by examiner

*Primary Examiner*—Carol S. W. Tsai
(74) *Attorney, Agent, or Firm*—Shumaker & Sieffert, P.A.

(57) ABSTRACT

The thermal decay of data written to a magnetic mass storage medium is determined by measuring and analyzing the time-domain equalized-signal-to-noise ratio (ESNR) and equalized signal-to-total-distortion noise ratio (ESTDR) of written data. In some embodiments, a test track and a reference track are initialized from data. Subsequently, the reference track is re-initialized from the test data, and the time-domain ESNR and/or ESTDR measurements are made of the test track and the reference track, at predetermined time intervals. Later, the time-domain ESNR and ESTDR measurements are analyzed to determine the thermal decay of the data written. In another embodiment of the present invention, the ESNR and/or ESTDR measurements includes reading the data through a non-return-to-zero bus in phases, in which the phases are selected in sequence.

23 Claims, 11 Drawing Sheets

SYSTEMS, APPARATUS, AND METHODS TO DETERMINE THERMAL DECAY CHARACTERIZATION FROM AN EQUALIZED SIGNAL-TO-NOISE RATIO OF A MAGNETIC DISC DRIVE DEVICE

RELATED APPLICATION

This application claims the benefit of U.S. Provisional Application Ser. No. 60/302,199 filed Jun. 29, 2001, under 35 U.S.C. 119(e).

This application is related U.S. patent application Ser. No. 09/963,879 filed Sep. 26, 2001.

FIELD OF THE INVENTION

This invention relates generally to magnetic disc drive performance and more particularly to determining the time-domain equalized signal-to-noise ratio of a magnetic disc drive device.

BACKGROUND OF THE INVENTION

Recording capacity of magnetic hard disc drives is increasing at a high annual rate. In order to achieve satisfactory recording system performance, high linear and track densities are required. In order to attain high linear and track densities, especially high linear density, magnetic material that is deposited onto a surface of a recording medium of the magnetic disc drive is manufactured in increasingly smaller diameters. Very small particles of magnetic material can become magnetically unstable in the presence of thermal agitation. The minimum size of a magnetic particle is limited by the effect of thermal energy surrounding the particle. The effect of the thermal energy reduces, or eliminates, the ability of a magnetic particle to hold a charge. This effect is referred to as the super-paramagnetic effect. The limit for a magnetic particle to hold a charge is referred to as the super-paramagnetic limit.

The super-paramagnetic effect is detrimental to the reliability of a magnetic hard disc drive, and the integrity of the data stored on the magnetic hard disc drive. Magnetic material affected by the super-paramagnetic effect becomes unstable and loses its magnetic state. An unstable and/or lost magnetic state is undesirable because information is stored in magnetic hard disc drives in the form of magnetic states. Losing these magnetic states is equivalent to losing data.

The super-paramagnetic effect is characterized by the rate of degradation of signal amplitude. One rate of degradation follows a sinusoid analog signal, such as a constant "2T pattern." Constant 2T patterns are well known to those skilled in the art. The rate of degradation is also called thermal decay measurement.

The thermal decay measurement of magnetic disc drive devices is tested during design prototyping to determine the quality and/or reliability of the device. To test a prototype device during a design phase of a magnetic disc drive, firmware that certifies a design is downloaded to a read-only-memory (ROM) of the prototype magnetic disc drive device, and the design certification firmware is executed. The design certification firmware includes a number of certifying tests. During the design certification process, the design certification tests are executed on a magnetic disc drive device in a predetermined sequence of the tests until the entire sequence of certifying tests is completed or halted. The sequence of certifying tests will halt when any one of the tests in the sequence fails.

One of the certifying tests is a test of the bit error rate (BER) of the magnetic disc drive device. The BER is an indication of the quality and/or reliability of the device during certifying a design for acceptance or failure rejection. The BER is also used for tuning a read channel of the magnetic disc drive device. However, BER determination is a slow process that increases the cost of certifying a design and tuning a magnetic disc drive device. Moreover, is it difficult to correlate the amplitude degradation rate of the signal to a bit error rate (BER). The BER is an important specification for magnetic disc drives.

One conventional method of determining the BER when certifying a design of a magnetic disc drive device includes determining the time-domain equalized signal-to-noise ratio (ESNR). The time-domain ESNR of a magnetic disc drive device is closely correlated with the BER of the magnetic disc drive device. The time-domain ESNR is determined by computer-readable logic that is implemented outside of the magnetic disc drive device. The time-domain ESNR test logic is not stored on, or downloaded to memory of the magnetic disc drive device. In one example, the logic is implemented in software on a host computer that is operably coupled to the magnetic disc drive device through a communication channel or link. The logic is executed after retrieving the respective data from the magnetic disc drive device. However, the communication channel or link between the device that implements the time-domain ESNR logic and the magnetic disc drive device is slow. The slow link has the effect of delaying transfer of magnetic disc drive data that is input to the time-domain ESNR logic.

Furthermore, in conventional systems, user data stored on a magnetic disc drive device is difficult to reconstruct or repair when errors are introduced to the user data. User data is difficult to reconstruct because user data appears to be random with no regular pattern, and is reflected as a random analog signal. In contrast to a constant sinusoid analog signal that characterizes the Super-paramagnetic effect.

A conventional method of performing time-domain equalized signal-to-noise ratio (ESNR) calculation includes oversampling an analog read-back signal. The analog read-back signal is received from a magnetic disc drive device with a high speed digital storage oscilloscope (DSO). The oversampled digital data is received by a software read channel. The software read channel is a signal processing program that is external to the magnetic disc drive device. The software read channel synchronizes the disc drive with the DSO for measurement of the time-domain ESNR. The software read channel simulates the operation of a physical read channel up to a stage of input to a Viterbi Detector, which is primarily equalization. The equalized signal is then resampled at the input to the viterbi detector for statistical analysis to determine the time-domain ESNR. However, the simulation of the operation of the physical read channel by the software read channel is less accurate than actual operation of the physical read channel. In addition, preparation for measuring the amplitude degradation rate of a magnetic disc drive is also cumbersome in conventional systems. This conventional method is tedious and requires extensive external software processing and additional equipment, such as the DSO Furthermore, the read channel of conventional mass storage devices includes the ability to redirect digital samples to a non-return-to-zero (NRZ) bus. A NRZ bus is transmits data in digital binary form, whereby each positively or negatively charged data bit is separated from its predecessor and successor by time rather than a neutral charge.

Sample signals from a read head of the mass storage medium are converted from analog to digital by an analog to digital converter (ADC). FIG. 10 illustrates a conventional analog signal of read data from a mass storage medium.

However, the ADC operates much faster than the NRZ bus, in some examples, approximately eight times faster. Thus, only one phase of read data can be output to the NRZ bus for every eight phases of read data. FIG. 11 illustrates conventional sampling of one of every eight phases of an analog signal of read data.

In FIG. 11, one out of every eight phases is sampled, indicated by the dots along the analog signal. Sampling one out of every eight phases does not allow a comprehensive analysis of the behavior of the mass storage device.

What is needed is a system, method and/or apparatus that provides a reliable test of a design prototype of a magnetic disc drive device. In addition, a system, method and/or apparatus that provides sampling of all phases of read signals from a mass storage medium of a mass storage device is needed.

The present invention provides a solution to this and other problems, and offers other advantages over the prior art.

SUMMARY OF THE INVENTION

The above-mentioned shortcomings, disadvantages and problems are addressed by the present invention, which will be understood by reading and studying the following specification.

The present invention provides systems, apparatus and methods in which the thermal decay of data recorded on a magnetic mass storage medium of a mass storage device is characterized. In one embodiment of the present invention, a method to characterize thermal decay of data recorded on a magnetic mass storage medium of a mass storage device includes writing reference data to a reference track and an adjacent track, on the magnetic mass storage medium of the mass storage device, writing test data to a test track on the magnetic mass storage medium of the mass storage device and determining a time-domain equalized-signal-to-total-distortion ratio (ESTDR) and an equalized signal-to-noise ratio (ESNR) from the test data and from the reference data 350. In another embodiment of the present invention, an apparatus includes a magnetic disc, a processor operably coupled to the magnetic disc, and a means operative on the processor to write test data to a test track on the disc once during a performance of the means, to write test data a plurality of times to a reference track on the disc, and to measure the time-domain ESNR and the ESTDR of the test track and the reference track, and to characterize the thermal decay of the disc from the time-domain ESNR and the ESTDR. In one embodiment of the present invention, a method to characterize thermal decay of data recorded on a magnetic mass storage medium of a mass storage device includes reading test data from the magnetic mass storage medium of the mass storage device, reading reference data from the magnetic mass storage medium of the mass storage device, and determining an ESTDR and the ESNR from the read test data and from the read reference data. In some embodiments, the reading steps further include sampling a plurality of digital signals of reference data in a plurality of phases, yielding a plurality of digital samples, the plurality of digital signals being sampled through a non-return-to-zero bus from a Viterbi Detector of a mass storage medium, and arranging the plurality of reference digital samples in chronological order. In some embodiments, the sampling is repeatedly performed in a plurality of performances during a predetermined time period, including a delay of a predetermined time between each of the plurality of performances. In another embodiment of the present invention, an apparatus includes a phase selector, to select a phase of data to be read from magnetic disk through a non-return-to-zero bus. In another embodiment of the present invention, an apparatus includes a track list, having a plurality of representations of one or more addresses of associated test and reference portions on the magnetic disc, wherein the track list includes at least one representation of a reference track and a least one representation of a test track, and a track selector operably coupled to the track list, to traverse the track list, to obtain the representations from the track list, and to transmit test data and reference data to the magnetic disc. These and various other features as well as advantages which characterize the present invention will be apparent upon reading of the following detailed description and review of the associated drawings.

DETAILED DESCRIPTION

Figure 1:
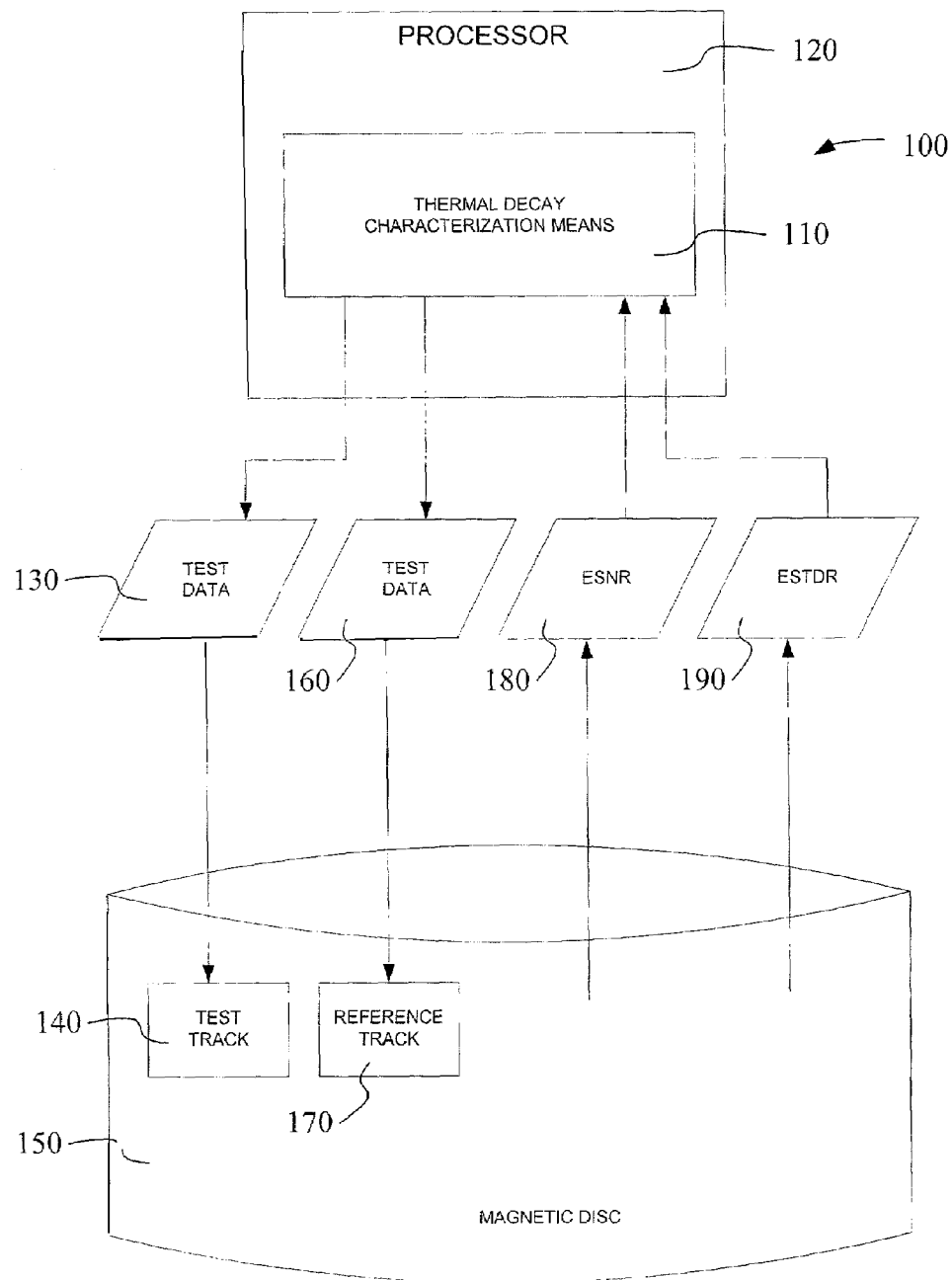
FIG. 1 is a block diagram that provides a system level overview of the operation of embodiments of the present invention.

FIG. 1 is a block diagram that provides a system level overview 100 of the operation of embodiments of the present invention. Some embodiments of the invention operate in a processor or microcontroller of a magnetic disc drive, such as disc controller 914 in FIG. 9.

System 100 includes a thermal decay characterization means 110 operative on a processor 120 to write test data 130 to a test track 140 on a magnetic disc 150 once during a performance of the means 110. The thermal decay characterization means 110 is also operative to write test data 160 a plurality of times to a reference track 170 on the magnetic disc 150. Furthermore, the thermal decay characterization means 110 is operative to gather the time-domain equalized-signal-to-noise ratio (ESNR) represented time-domain ESNR data 180 of the test track 140 and the reference track 170. Moreover, the thermal decay characterization means 110 is operative to gather the equalized signal-to-total-distortion noise ratio (ESTDR) represented by the ESTDR data 190 of the test track 140 and the reference track 170, and to characterize the thermal decay of the magnetic disc 150 from the time-domain ESNR data 180 and/or the ESTDR data 190.

The thermal decay characterization means 110 initializes a test track 140 once during a performance of the means 110. The test track 140 is initialized from test data 130 a first time that the test track 140 is used during a performance of the means 110 because the test track 140 is used to determine the thermal decay during a relatively long period of time of performance of the means 110. Moreover, in thermal decay, magnetic dipole relaxation within a magnetic transition causes the signal of the written test data 130 to weaken, and thus the time-domain ESNR measurement of the written test data 130 weakens. When contrary to the teachings of the present invention, the test track 140 is regularly and/or frequently written, each writing would reset a weakened state of a signal to a stronger state, thus preventing determination of thermal decay of the test data during a relatively long period of time. According to the teachings of the present invention, the reference track 170 is regularly rewritten with test data 160, which resets a weakened state in the reference track 170 to a stronger state, providing a reference of comparison to the test track 140. Thus, the present invention ensures that the measurement of thermal decay of time-domain ESNR data 180 and/or ESTDR data 190 on the test track 140 results substantially from magnetic transition and not any other effect, such as head degradation.

System 100 provides the advantage of measuring thermal decay of time-domain ESNR data 180 on the test track 140 that is substantially a result of magnetic transition and not any other effect, such as head degradation. Time-domain ESNR is closely correlated to bit-error-rate (BER). A time-domain ESNR measurement can be performed much faster than BER measurement. The speed of the test is well-suited for thermal decay measurement as it is advantageous to obtain data quickly after the first write is performed. In some embodiments, system 100 uses an ESTDR measurement, that advantageously provides total signal distortion, linear and non-linear distortion, data of the signal measured under thermal influence.

System 100 also provides the advantage of not requiring an external measurement instrument attached to the disc drive. Because the processor includes the thermal decay characterization means 110, the disc drive is capable of extracting and calculating time-domain ESNR and ESTDR through firmware. This not only saves cost, it also allows certifying a design of drives without requiring costly external measurement instrument, such as a digital storage oscilloscope (DSO). In some embodiments, the only external apparatus required in the present invention is a temperature chamber to encase the system 100 to provide thermal isolation to the systems 100.

One advantage of the present invention is that the equalization process is performed using a hardware read channel, preferably an integrated circuit (IC) rather than a software read channel to simulate the hardware read channel as in conventional systems. The hardware read channel more accurately determines the performance of the channel IC. Another advantage of the present invention is that a signal is re-sampled by the hardware read channel substantially similar to an onboard ADC. The re-sampling by the hardware read channel is more accurate than the conventional method of over-sampling the signal with a DSO and sending the data to a software read channel to be re-sampled again in simulating the ADC of an actual read channel.

Figure 2:
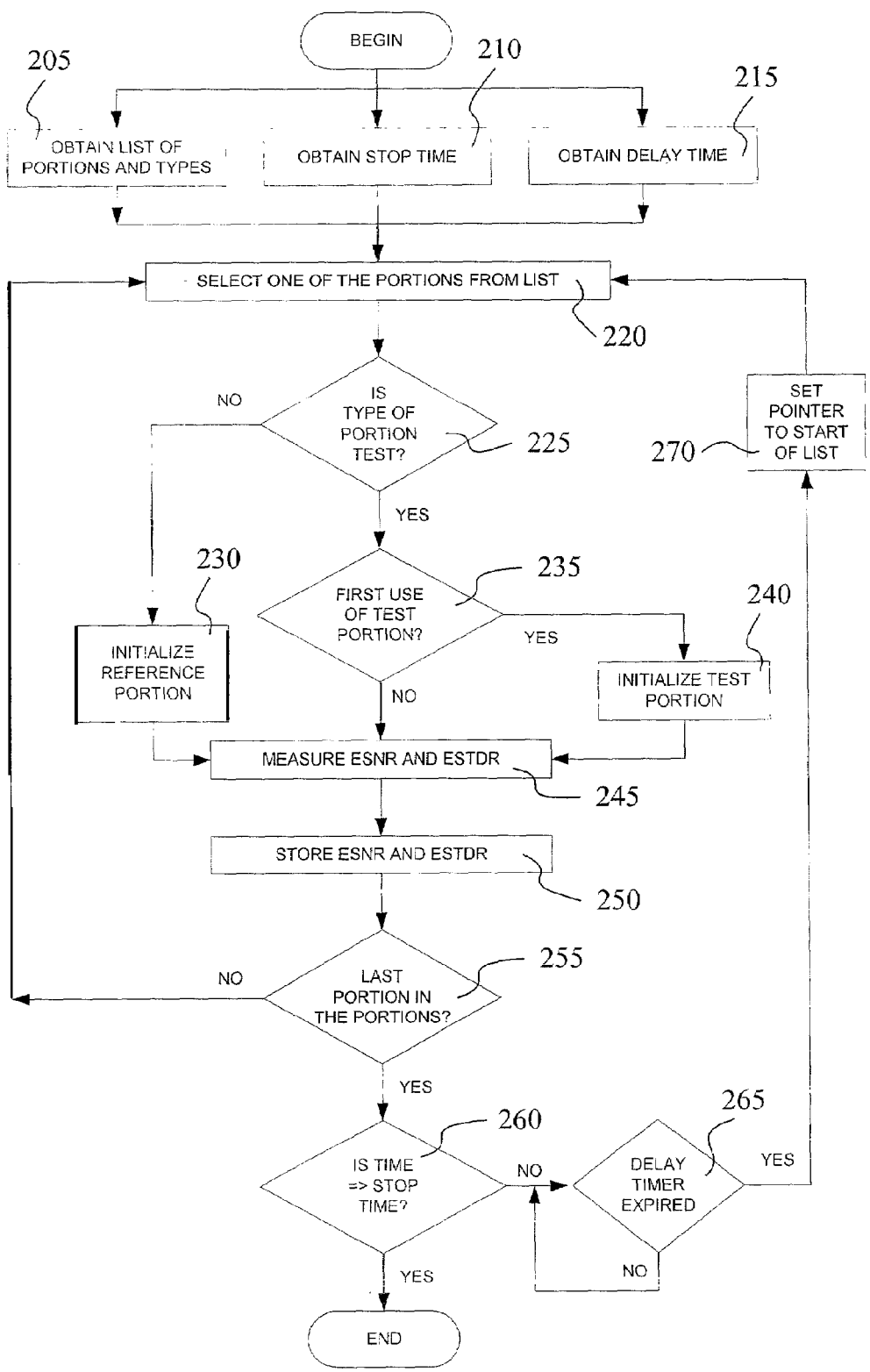
FIG. 2 is a flowchart of a method of characterizing the thermal decay of data recorded on a magnetic mass storage medium of a mass storage device, according to embodiments of the present invention.

FIG. 2 is a flowchart of a method 200 of characterizing the thermal decay of data recorded on a magnetic mass storage medium of a mass storage device, according to embodiments of the present invention.

Some embodiments of method 200 include defining, receiving and/or obtaining a plurality of representations of one or more addresses of associated test and reference portions on the magnetic mass storage medium, in block 205. In some embodiments where the magnetic mass storage medium is a magnetic disc mass storage medium, the portions include data tracks and the one or more addresses include head positions and track positions of the data tracks.

In some embodiments, the plurality of representations includes at least one representation of a reference track and a least one representation of a test track. In some embodiments, a reference track has an address that is in close physical proximity close to a test track to ensure that the reference track and the test track have similar characteristics (e.g. linear density and frequency).

In some embodiments, the plurality of representations includes a list or table. In some embodiments, block 205 includes setting a representation of an index or pointer to the start of the plurality of representations of one or more addresses of associated test and reference portions (not shown). In some embodiments of block 205, where the plurality of representations is a list, a pointer to individual representations in the list is modified, updated, or set to indicate or point, to the first representation in the list.

Some embodiments of method 200 also include defining, receiving and/or obtaining a stop time, in block 210. In some embodiments, the stop time defines or identifies either total time for performance of characterizing the thermal decay of data recorded on a magnetic mass storage medium of a mass storage device, such as "24" hours. In some embodiments, the stop time defines or identifies or a time with respect to the local time, such as "2 PM."

Some embodiments of method 200 also include defining, receiving and/or obtaining delay time for test intervals, in block 215. In some embodiments, test intervals provide a time interval of delay between iterations or performances of a test. The delay is implemented because a steady stream of tests is not necessary because the delay is predetermined to provide statistically significant and reliable quantities of test data.

Thereafter, method 200 includes a loop of gathering data that is pertinent to the reliability of the mass storage device. The loop measures time-domain equalized-signal-to-noise-ratio (ESNR) data and equalized signal-to-total-distortion noise ratio (ESTDR) data that characterize the thermal decay of data recorded in the test and reference portions on the magnetic mass storage medium of the mass storage device.

In some embodiments, between the time delay, the plurality of representations of the test and reference portions are iterated, each representation is initialized accordingly, measurements of the portions are taken, and stored for later analysis.

Some embodiments of method 200 also include selecting one of the plurality of representations of one or more addresses of associated test and reference portions, block 220. In some embodiments, the next sequential instance in the plurality is selected, such as the first instance.

Some embodiments of method 200 also include determining whether or not the selected representation indicates a test or a reference portion, in block 225. When the determining in block 225 indicates that the selected representation represents a reference track, method 200 also includes initializing the reference track, in block 230. In some embodiments of the initializing the reference track, the initializing includes direct current (DC) erasure of the data on the reference track and at least one other track that is adjacent to the reference track.

In some embodiments of the initializing, the reference track is written with test data, such as a pseudo random bit pattern. The pseudo random bit pattern is also known as a pseudo random binary sequence (PRBS or PRS). In one embodiment, pseudo-random patterns are apparently random, but in fact are pre-determined or deterministic, such as through the generation of random numbers on conventional computer systems in which the same sequence of random numbers are generated each time a random-number generator is initialized and used. Conventionally, the random-number generator is initialized with a "key" number, with which the random-number generator will thereafter generate the same sequence of numbers every time a particular key is used. In varying embodiments, the length of the bit pattern is 31 or 127 bits.

In some embodiments, when the determining in block 225 indicates that the selected representation represents a test track, method 200 also includes determining in block 235 if the test track is being tested for the first time after selecting one of the test or reference portions in block 220. When the determining in block 235 indicates that the test track is being used or tested for the first time after selecting one of the test or reference portions initializing the test track, in some embodiments the method includes initializing the test track in block 240. In some embodiments, the initializing in block 240 is substantially similar to the initializing described above in conjunction with block 230.

After the test or reference selection is processed accordingly in blocks 230, 235, and 240, method 200 includes reading the test data and the reference data and determining or measuring a time-domain equalized-signal-to-total-distortion ratio (ESNR) and an equalized signal-to-total-distortion noise ratio (ESTDR) from read test data and from the read reference data, in block 245.

In some embodiments, using a pseudo random binary sequence (PRBS or PRS) that contains M repeating cycles of a bit pattern having N bits, the following calculations are performed:

Assuming $$V \sum_{m=1}^{M}\sum_{n=1}^{N} a_{mn} \text{ and } H_{mn} \; a_{mn} - \overline{a_{mn}},$$

where
$H_{mn}$ sampling error;
$a_{mn}$ ADC sample output; and $$\overline{a_{mn}}$$

Ideal Target Sample

Then $$\zeta^2_{MSE} = \frac{1}{MN}\sum_{m=1}^{M}\sum_{n=1}^{N} H_{mn}^2 - \left(\frac{1}{MN}\sum_{m=1}^{M}\sum_{n=1}^{N} H_{mn}\right)^2$$

where
M=the m-th cycle of the PRS; and
N=the n-th bit of the PRS

Breaking down into noise and NLD:

with $$\zeta^2_{MSE} = \zeta^2_{Noise} + \zeta^2_{NLD}, \text{ with}$$

$$\zeta^2_{Noise} = \frac{1}{N}\sum_{n=1}^{N}\left(\frac{1}{M}\sum_{m=1}^{M}H_{mn}^2 - \left(\frac{1}{M}\sum_{m=1}^{M}H_{mn}\right)^2\right),$$

$$\zeta^2_{NLD} = \frac{1}{N}\sum_{n=1}^{N}\left(\frac{1}{M}\sum_{m=1}^{M}H_{mn}\right)^2 - \left(\frac{1}{N}\sum_{n=1}^{N}\frac{1}{M}\sum_{m=1}^{M}H_{mn}\right)^2$$

The time-domain equalized signal-to-noise ratio (ESNR) is then calculated as:

$$ESNR = 20 * \log \frac{S_{EPR4sample}}{Noise_{PRSrms}}$$

$$= 20 * \log \frac{S_{PRSrms}}{Noise_{PRSrms}} + 10 * \log \frac{N}{N1}$$

$$\frac{S_{EPR4sample}}{S_{PRSrms}} = \sqrt{\frac{N}{N1}}, \text{ where } N = PRS \text{ Length}$$

$$S_{PRSrms} = SignalEPR4$$

$$ESNR_{rmse} = 20 * \log\left(\frac{SignalEPR4^2}{\zeta^2_{MSE}}\right)$$

$$ESNR_{noise} = 20 * \log\left(\frac{SignalEPR4^2}{\zeta^2_{Noise}}\right)$$

-continued $$ESTDR\ 20*\log \begin{Bmatrix} \dfrac{SignalEPR^2}{\zeta_{NLD}^2} \div \\ \div \\ \neq \end{Bmatrix}$$

where ESTDR is equalized signal-to-total-distortion ratio. The exact formulas used to calculate the time-domain ESNR and ESTDR are not critical to the present invention; in some other embodiments, other formulas that are well-known to those of ordinary skill in the art are used to calculate the time-domain ESNR and ESTDR.

In some embodiments, method 200 also includes storing the time-domain ESNR data and/or the ESTDR data, in block 250. The data is stored in any one the many mediums well-know to those skilled the art, such as random access memory (RAM), or a mass storage device. In some embodiments, the data is stored by a database manager (DBM).

Thereafter, method 200 includes determining whether or not the representation of a test or reference portion that was selected in block 225, is the last representation in the plurality of representations, in block 255. When the determining in block 255 indicates that the representation is not the last of the plurality of representations, method 200 continues at block 220.

When the determining in block 255 indicates that the representation is the last of the plurality of representations, method 200 includes determining whether or not the current time is equal to or greater than the stop time, in block 260. Where the stop time defined in block 210 is total performance time, the current time is the total elapsed time since the timer was started in block 210. Where the stop time defined in block 210 is the local time, the current time is the local time obtained from a clock.

When the current time is no equal to or greater than the stop time, the method continues by pausing in the amount of delay time that is defined in block 215. In some embodiments, a second timer is initialized and started (not shown). Thereafter, the second timer is polled until the second time equals or exceeds the delay time, in block 265. Subsequently, method 200 includes setting a representation of an index or pointer to the start of the plurality of representations of one or more addresses of associated test and reference portions, in block 270. In some embodiments of block 270, where the plurality of representations is a list, a pointer to individual representations in the list is modified to indicate or point to the first representation in the list.

When the current time is no equal to or greater than the stop time in block 260, in some embodiments, method 200 ends. In some embodiments, the method thereafter includes analyzing the time-domain ESNR and/ or ESTDR data that was stored in block 250.

In method 200, in which the characterization of the thermal decay of data recorded on a magnetic mass storage medium is determined, a test portion is initialized only once. The test portion is initialized, the first time, that the portion is used, block 240, because the test portion is used to determine the thermal decay during a relatively long period of time. Moreover, in thermal decay, magnetic dipole relaxation within a magnetic transition causes the signal of the data to weaken, and thus the time-domain ESNR measurement weakens. When contrary to the teachings of the present invention, the test portion is re-written in every iteration in the method, each re-writing would reset a weakened state of a signal to a stronger state, thus preventing determination of the thermal decay during a relatively long period of time. According to the teachings of the present invention, the reference portion is re-written during every iteration in the method, which resets a weakened state in the reference portion to a stronger state, providing a reference of comparison to the test portion. Thus, the present invention ensures that the measurement of thermal decay of time-domain ESNR and/or ESTDR on the test portion in block 245 results substantially from magnetic transition and not any other effect, such as head degradation.

Figure 12:
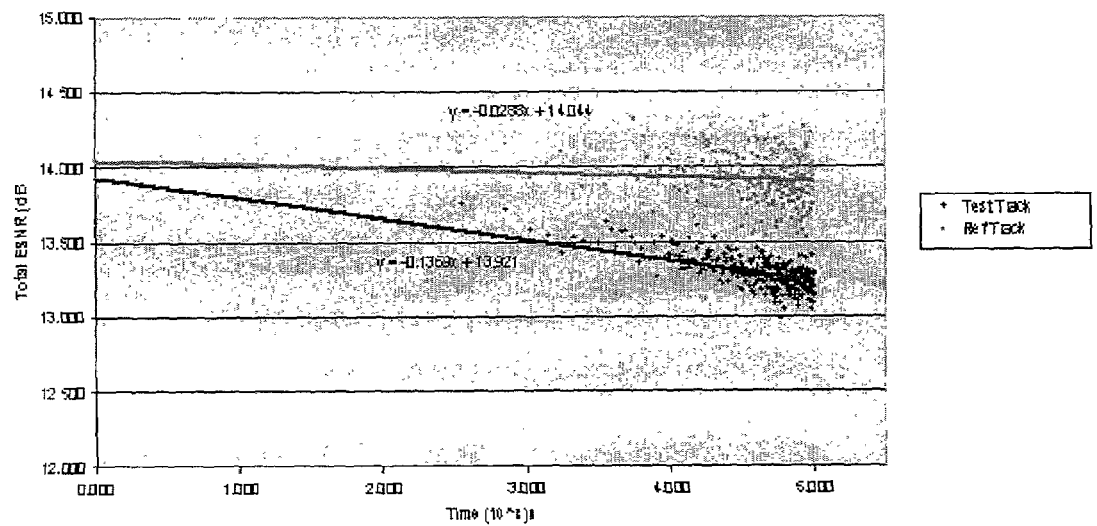
FIG. 12 illustrates an example of a graphical representation of measurements of a test portion and a reference portion.

In some embodiments, the analyzing includes generating a graphical representation of the relation of time-domain ESNR and/ or ESTDR in comparison to time. FIG. 12 illustrates an example of a graphical representation of measurements of a test portion and a reference portion over a 100,000 second interval (approx. 27.8 hours).

In FIG. 12, individual time-domain ESNR measurements of a reference track are shown by square-shaped points. An upper line represents a regression of the reference track measurements. The upper regression line of reference track measurements is characterized by the formula Y=−0.0288X+14.044 where Y represents the time-domain ESNR measurement of the reference track and X represents time measured in seconds.

In table 3, individual time-domain ESNR measurements of a test track are shown by plus-shaped points. A lower line represents a regression of test track measurements. The lower regression line of test track measurements is characterized by the formula Y=−0.1369X+13.921 where Y represents the time-domain ESNR measurement of the test track and X represents time measured in seconds.

Figure 13:
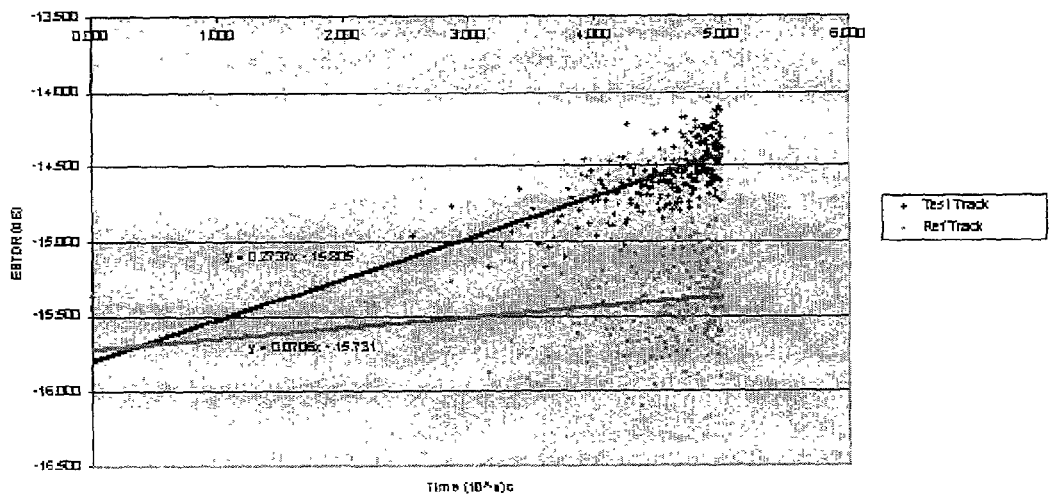
FIG. 13 illustrates an example of a graphical representation of ESTDR measurements of a test portion and a reference portion.

FIG. 13 illustrates an example of a graphical representation of ESTDR measurements of a test portion and a reference portion over a 100,000 second interval (approx. 27.8 hours).

In FIG. 13, individual ESTDR measurements of a test track are shown by plus-shaped points. An upper line represents a regression of the test track measurements. The upper regression line of test track measurements is characterized by the formula Y=0.0705X+15.731 where Y represents the ESTDR measurement of the test track and X represents time measured in seconds.

In table 4, individual ESTDR measurements of a reference track are shown by square-shaped points. A lower line represents a regression of the reference track measurements. The lower regression line of reference track measurements is characterized by the formula Y=0.2737X−15.205 where Y represents the ESTDR measurement of the reference track and X represents time measured in seconds.

Figure 3:
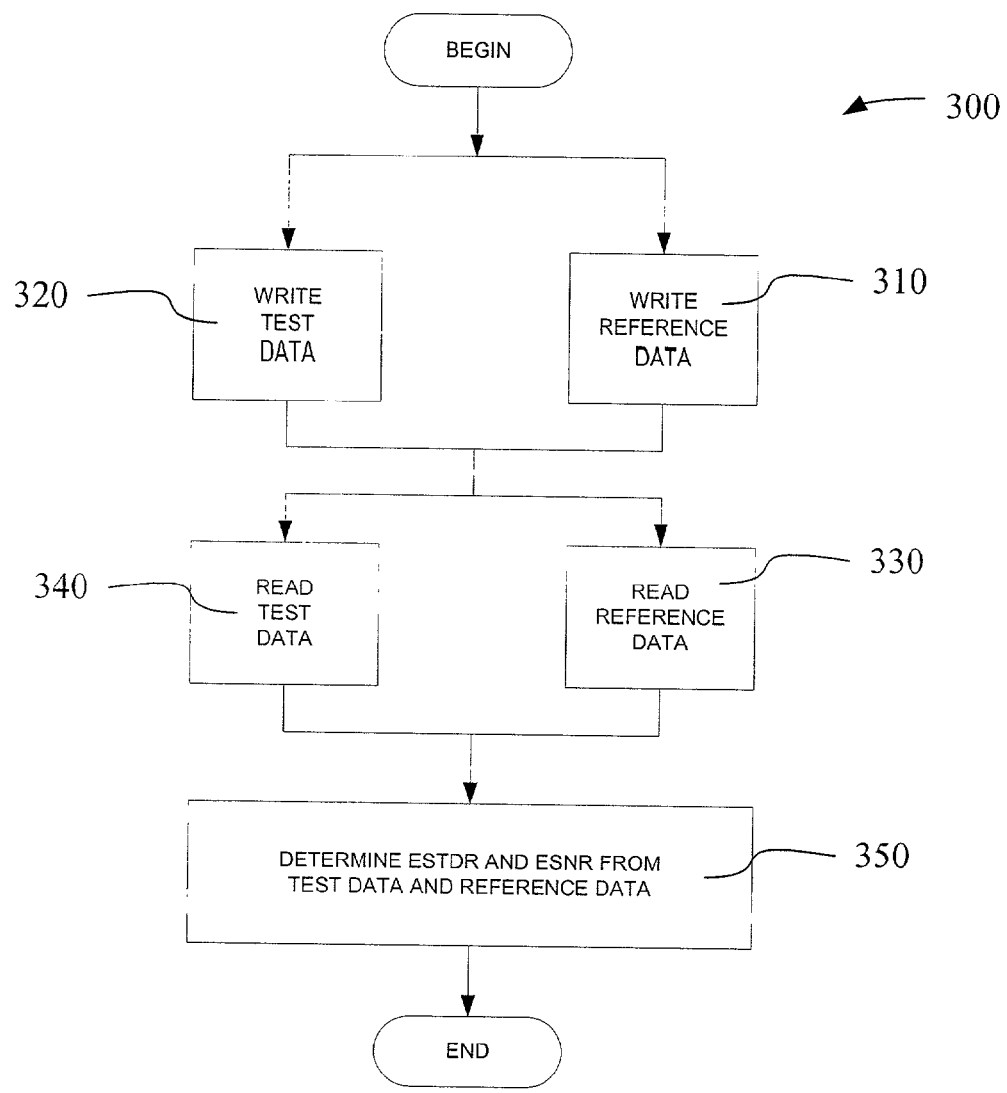
FIG. 3 is a flowchart of a method for characterizing the thermal decay of data recorded on a magnetic mass storage medium of a mass storage device.

FIG. 3 is a flowchart of a method 300 for characterizing the thermal decay of data recorded on a magnetic mass storage medium of a mass storage device. Method 300 includes writing reference data to a reference track and an adjacent track on the magnetic mass storage medium of the mass storage device, in block 310. Method 300 also includes writing test data to a test track on the magnetic mass storage medium of the mass storage device, in block 320. In varying embodiments, writing the reference data in block 310 is performed during after, and/or before reading the test data in block 320. In some embodiments, the reference data and the test data include a pseudo random 127-bit pattern.

Subsequently, method 300 includes reading reference data from the reference track and an adjacent track, on the magnetic mass storage medium of the mass storage device, in block 330. Method 300 also includes reading test data from the test track on the magnetic mass storage medium of the mass storage device, in block 340.

Subsequently, method 300 includes determining an equalized-signal-to-total-distortion ratio (ESTDR) and a time-domain equalized signal-to-noise ratio (ESNR) from the test data and from the reference data, in block 350. In some embodiments, block 350 includes measuring the ESTDR and measuring the time-domain ESNR from the test data and from the reference data.

Figure 4:
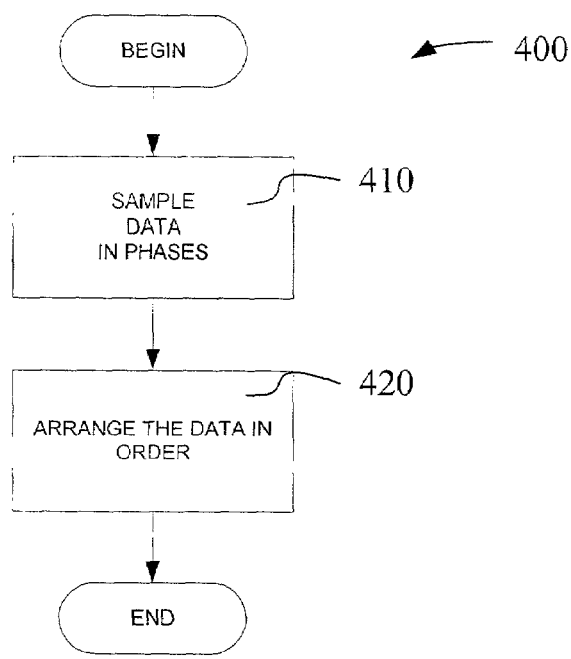
FIG. 4 is a flowchart of a method for reading from a test track and/or reading from a reference track, according to embodiments of the present invention.

FIG. 4 is a flowchart of a method 400 for reading from a test track and/or reading from a reference track, according to embodiments of the present invention. In some embodiments, method 400 is an embodiment of reading from a test track in block 340 in FIG. 3 and/or reading from a reference track in block 330 in FIG. 3.

Method 400 includes sampling a plurality of digital signals of data in a plurality of phases, in block 410. The sampling yields a plurality of data digital samples. In some embodiments, the plurality of data digital signals are sampled through a non-return-to-zero (NRZ) bus from a Viterbi Detector of a mass storage medium. In some embodiments, the data includes test data read in block 340 in FIG. 3. In some embodiments, the data includes reference data read in block 330 in FIG. 3. In some embodiments of method 400, sampling digital signals through a NRZ bus from a Viterbi Detector includes redirecting the digital signals of read data on a read channel from the Viterbi Detector of the mass storage medium to the NRZ bus, in order to capture the disc drive data buffer for processing.

Figure 14:
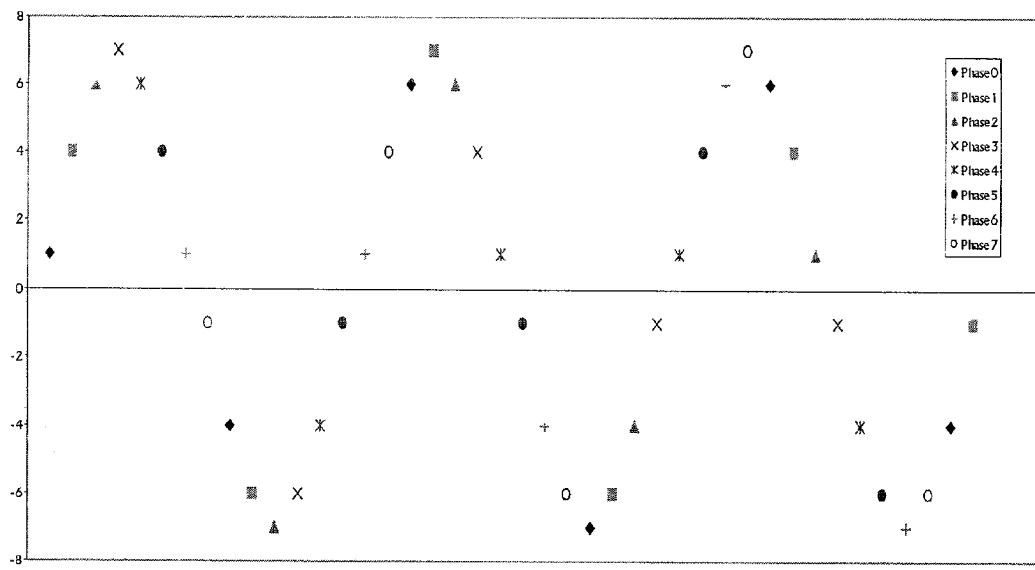
FIG. 14 illustrates phases of data sampled from a signal.

FIG. 14 illustrates phases of data sampled from a signal.

In FIG. 14, a sinusoidal wave having an amplitude of 8 along the Y axis, is sampled in eight phases over a time period along the X axis. The data points that are sampled by phase 0 are depicted by a diamond-shaped point. The data points that are sampled by phase 1 are depicted by a square-shaped point. The data points that are sampled by phase 2 are depicted by a triangle-shaped point. The data points that are sampled by phase 3 are depicted by a X-shaped point. The data points that are sampled by phase 4 are depicted by a double X-shaped point. The data points that are sampled by phase 5 are depicted by a shaded circle. The data points that are sampled by phase 6 are depicted by a plus-shaped point. The data points that are sampled by phase 7 are depicted by a hollow circle-shaped point. Each phase samples a portion of the signal. All eight phases in aggregate provide sampling of the entire signal. Table 5 of the present invention illustrates that substantially more data is gathered than in the conventional systems of Table 2.

In some embodiments, the sampling in block 410 is performed more than once. In some further embodiments, the sampling in block 410 includes delaying or pausing for a predetermined amount of time between each instance of performance. Similarly, in some embodiments, the sampling in block 410 is repeatedly performed in a plurality of performances during a predetermined time period, including a delay of a predetermined time between each of the plurality of the performances.

Method 400 also includes arranging the plurality of digital samples in chronological order, in block 420. In some embodiments, the arranging includes interleaving and/or organizing. As an example, the data is sampled thrice in eight (0–7) phases in block 410, from an original sequence of data {1, 9, 20 17, 2, 10, 18, 3, 11, 19, 4, 12, 20, 5, 13, 21, 6, 14, 22, 7, 15, 23, 8, 16, 24}. Three samples are obtained for each of the eight phases by the NRZ bus. The sampling is performed in the order of the phases, which is not in the original sequence that the data was generated {1, 2, 3, 4, 5, 6, 7, 8, 9, 10, 11, 12, 13, 14, 15, 16, 17, 18, 19, 20, 21, 22, 23, 24}. The relationship between the sampled data set from each phase, and the final arranged or interleaved data set is depicted in FIG. 15.

Figure 15:
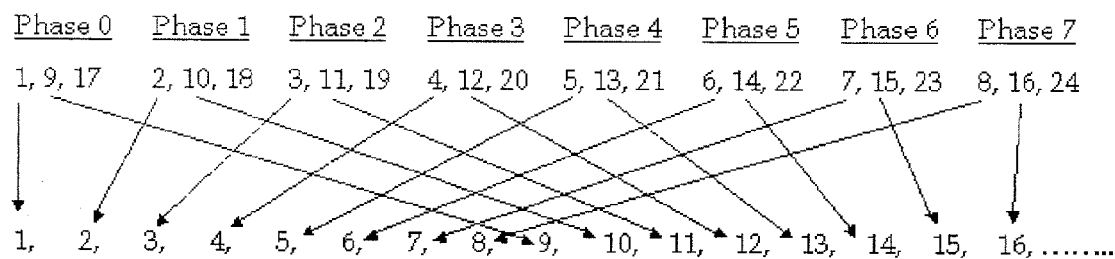
FIG. 15 illustrates an arrangement of interleaved data.

In FIG. 15, the sampled phase data at the top of the table is interleaved into the original chronological order at the bottom of the table.

Figure 5:
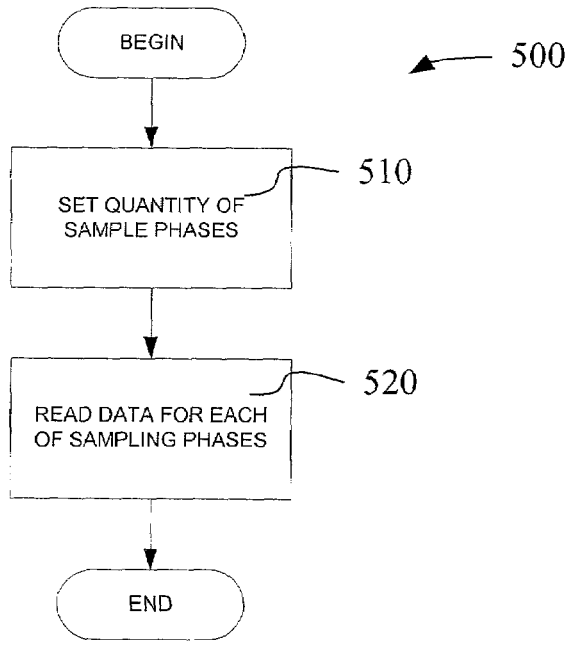
FIG. 5 is a flowchart of a method for obtaining data in phase through a non-return-to-zero bus, according to embodiments of the present invention.

FIG. 5 is a flowchart of a method 500 for obtaining data in phase through a non-return-to-zero bus, according to embodiments of the present invention. In some embodiments, method 500 is additional to method 400 in FIG. 4.

Method 500 includes setting the quantity of sampling phases of the NRZ bus, in block 510. Preferably, the phase is selected from a register within the hardware read channel. This register is basically a counter register that counts the number of clock cycles after the detection of a synchronization mark before initiating the phase data transfer. The Synchronization Mark is a special pattern embedded into the disk drive signal to initiate data transfer between the read channel and controller. By incrementing the counter register value one LSB at a time, different phases of data can be accessed. There are various names for the counter register: Phase Counter, Phase Register, Latch Counter, etc.

In some embodiments, method 500 also includes reading the data through the NRZ bus, for each of the sampling phases, for as many instances as the quantity of sampling phases, in block 520.

Figure 6:
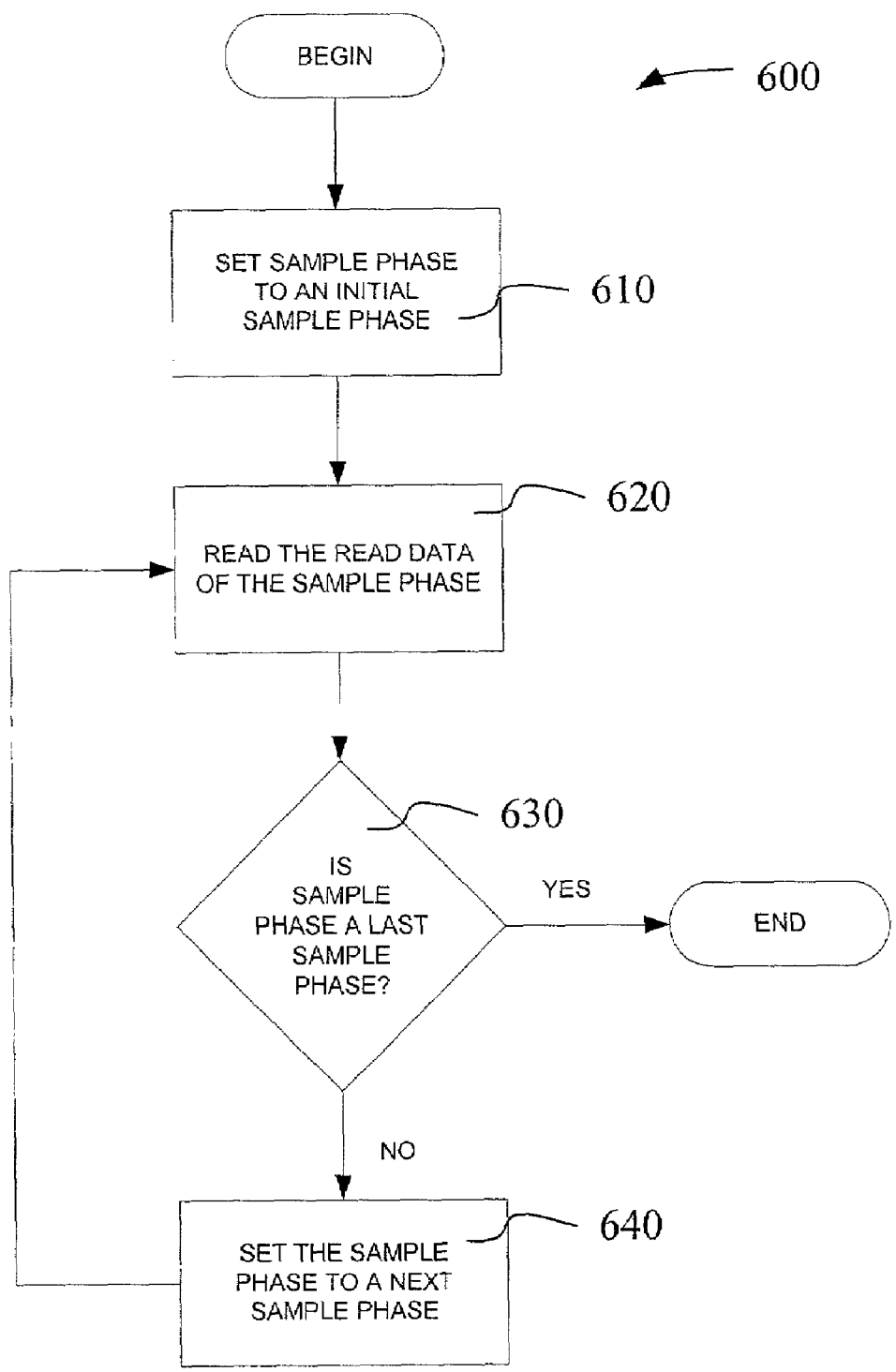
FIG. 6 is a flowchart of a method for reading from a test track and/or reading from a reference track, according to embodiments of the present invention.

FIG. 6 is a flowchart of a method 600 for reading from a test track and/or reading from a reference track, according to embodiments of the present invention. In some embodiments, method 600 is one embodiment of reading the data through the NRZ bus, in block 520 in FIG. 5.

Method 600 includes setting a sample phase to an initial sample phase, in block 610. In some embodiments, the setting in block 610 includes setting the sampling phase to output one sample for each eight samples of read data.

Subsequently, method 600 includes reading the read data of the sample phase as many times as the sampling, in block 620. Thereafter, method 600 includes determining whether or not the sample phase is a last sample phase, in block 630. Method 600 also includes setting the sample phase to a next sample phase, if the determining in block 630 indicates that the sample phase is not the last sample phase, in block 640. Method 600 also includes continuing the method at the setting in block 610 if the determining in block 630 indicates that the sample phase is not the last sample phase.

In some embodiments of method 200–600, the methods are performed on a prototype of a mass storage device during a design stage of the development of the mass storage device. In other embodiments, the methods are performed on a production unit of a mass storage device produced during a production stage of the mass storage device, wherein the production unit is a sample of plurality of mass storage devices produced during a production stage. In still other embodiment, methods 200–600 are implemented as a computer-accessible medium having executable instructions capable of directing a central processing unit, such as processor 120 in FIG. 1, processor 720 in FIG. 7, and/or disc controller 914 in FIG. 9, to perform the respective method. In varying embodiments, the medium is a magnetic medium, an electronic medium, or an optical medium.

Figure 7:
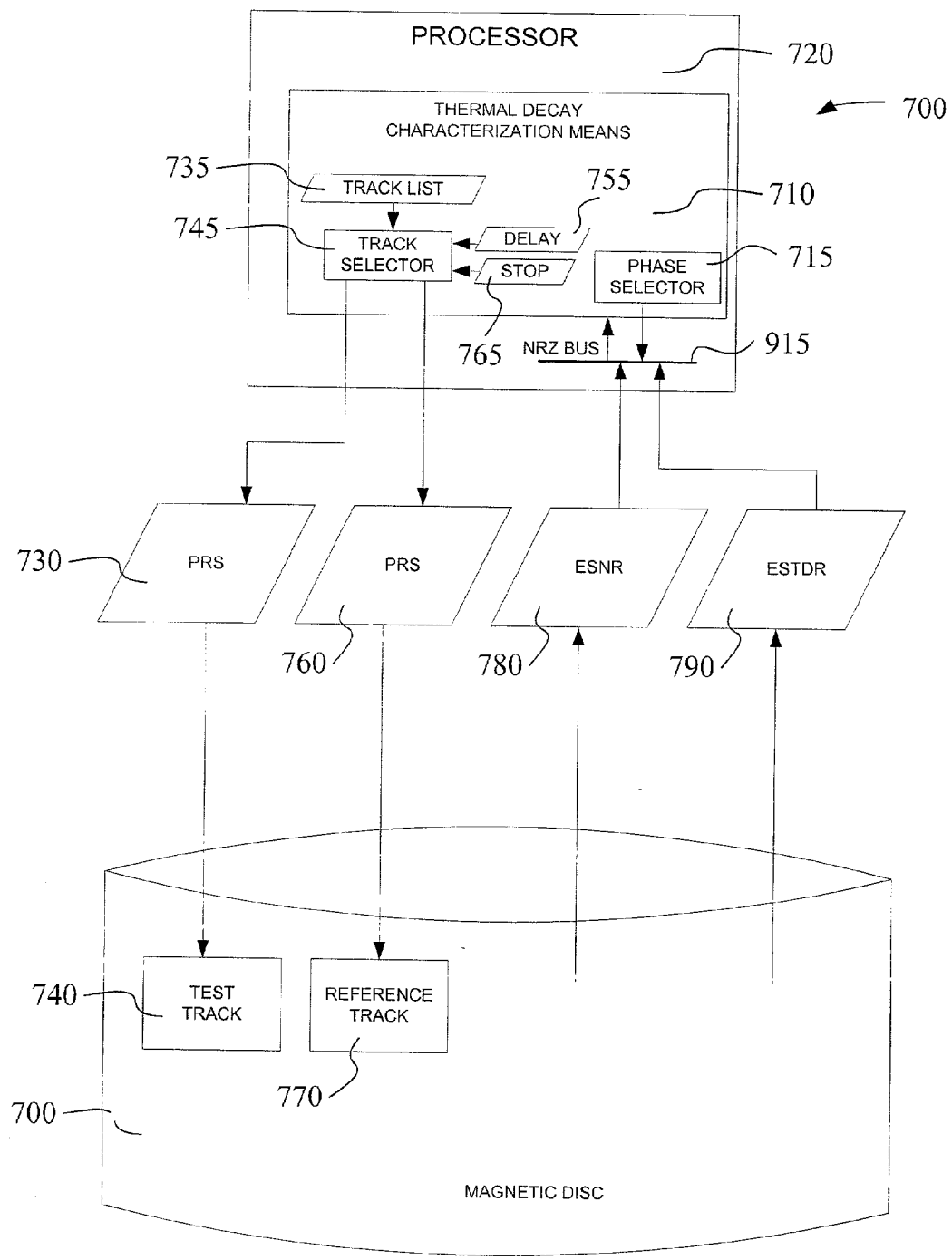
FIG. 7 is a block diagram of an apparatus to characterize the thermal decay of data recorded on a magnetic disc of a mass storage device, according to embodiments of the present invention.

FIG. 7 is a block diagram of an apparatus 700 to characterize the thermal decay of data recorded on a magnetic disc of a mass storage device, according to embodiments of the present invention. System 700 includes a thermal decay characterizer 710 operative on a processor 720 to write test data 730 to a test track 740 on a magnetic disc 750 once during a performance of the means 710. Some embodiments of the invention operate in a processor or microcontroller of a magnetic disc drive, such as disc controller 914 in FIG. 9.

The thermal decay characterizer 710 is also operative to write test data 760 a plurality of times to a reference track 770 on the magnetic disc 750. Furthermore, the thermal decay characterizer 710 is operative to gather the time-domain equalized-signal-to-noise ratio (ESNR) represented by the time-domain ESNR data 780 of the test track 740 and the reference track 770. Moreover, the thermal decay characterizer 710 is operative to gather the equalized signal-to-total-distortion noise ratio (ESTDR) represented by the ESTDR data 790 of the test track 740 and the reference track 770, and to characterize the thermal decay of the magnetic disc 750 from the time-domain ESNR data 780 and/or the ESTDR data 790.

Figure 9:
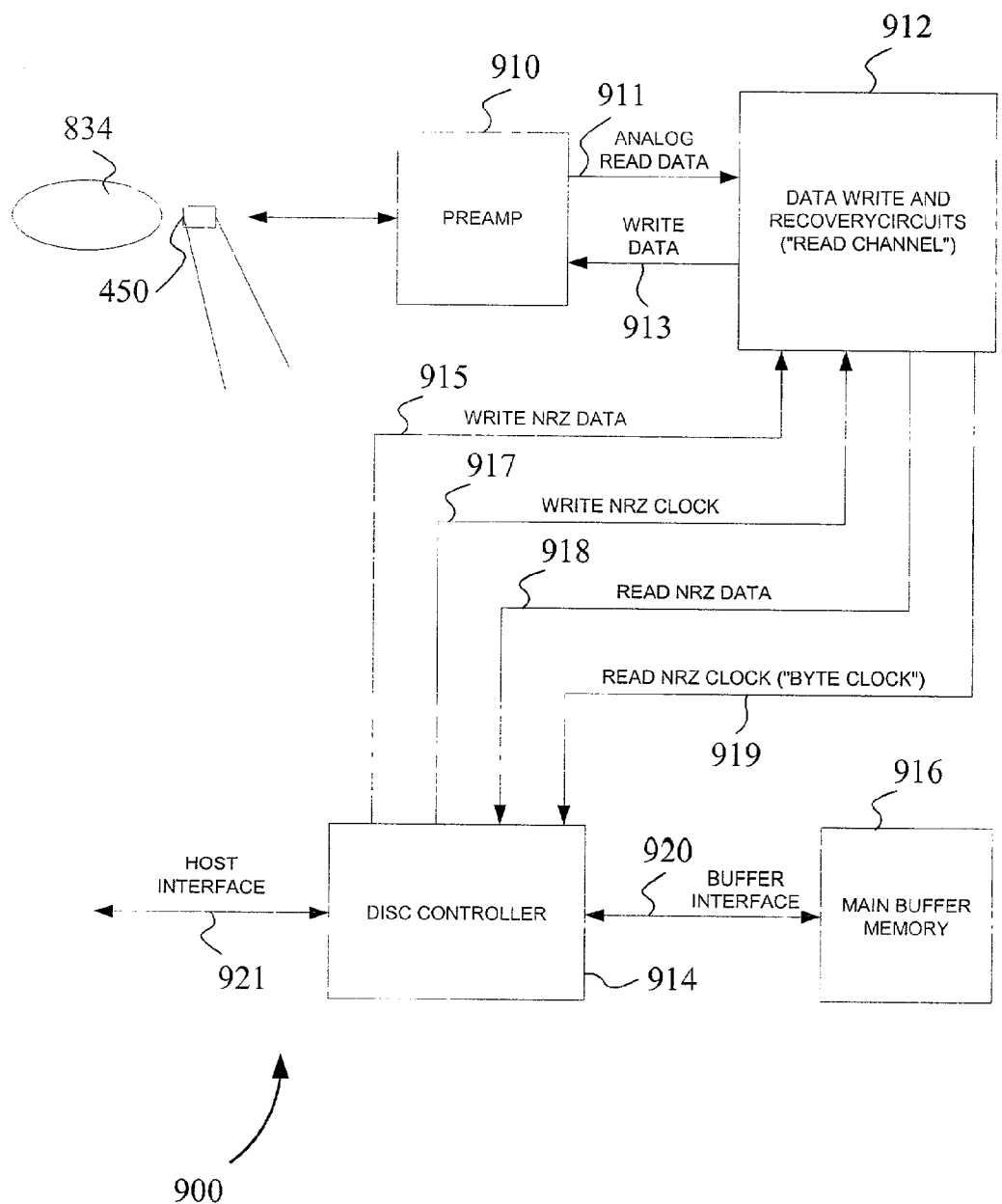
FIG. 9 is a high-level block diagram showing the main data paths in a conventional high-level disc drive architecture.
Figure 10:
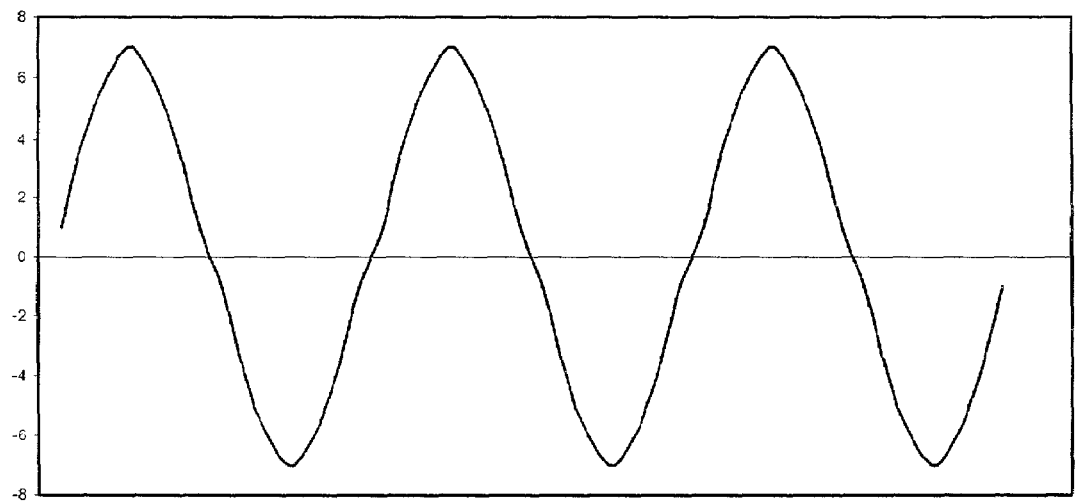
FIG. 10 illustrates a conventional analog signal of read data from a mass storage medium
Figure 11:
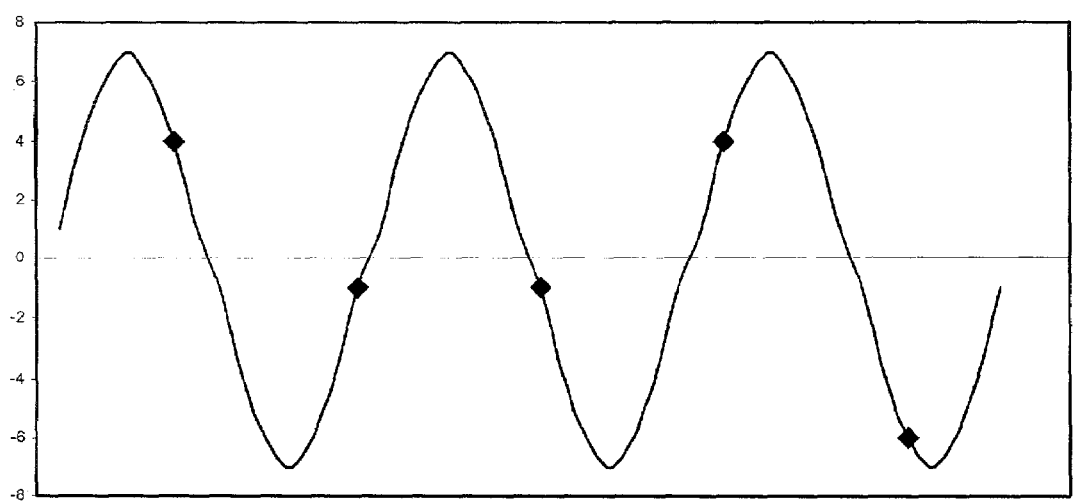
FIG. 11 illustrates conventional sampling of one of every eight phases of an analog signal of read data.

In some embodiments, the thermal decay characterizer 710 is operably coupled to the magnetic disc 750 through a non-return-to-zero (NRZ) bus 715. A read channel (not shown), such as read channel 912 in FIG. 9, is set or configured to output sampled data from an analog-to-digital (ADC) data to the NRZ bus 715. The time-domain ESNR data 780 and the ESTDR data 790 is sampled in phases through the NRZ bus 715. A phase selector 725 that is operably coupled to the NRZ bus 715, selects a phase of data to be read from the NRZ bus 715. Selecting the phase is advantageous because the NRZ bus 715 receives data through an analog-to-digital converter (ADC) (not shown) from the magnetic disc 750. The ADC typically sends data to the NRZ bus 715 at rates eight times faster than the NRZ bus 715 accepts data. The ratio of rate differentials between the ADC and the NRZ bus is one basis for the number of phases to be read from the NRZ bus. For example, when the ADC has a rate eight times faster than the NRZ bus 715, the number phases that are sampled is eight, in which all of the data from the ADC is captured through the NRZ bus 715. Therefore, selecting each of the phases in sequence, allows all data from the ADC to be captured through the NRZ bus 715.

In some embodiments, apparatus 700 also includes a track list 735. The track list 735 includes a plurality of representations of one or more addresses of associated test and reference tracks on the magnetic disc 750. The representations of one or more addresses of associated test and reference tracks in the track list 735 are also known as track representations. A track selector 745 traverses the track list 735. As each track representation is obtained from the track list, test data 730 and reference data 760 is transmitted to the magnetic disc 750 to be written. The traversal of the track list 735 is controlled by the track selector 745 in reference to the delay time 755 and the stop time 765. In one embodiment, the track selector 745 pauses for the quantity of delay time 755 between each traversal of the track list 735. In another embodiment the track selector 745 halts performance when a lapsed time since the beginning the performance of the track selector is equal to or greater than the stop time 765.

System 700 provides the advantage of measuring thermal decay of time-domain ESNR and ESTDR data 780 on the test track 740 that is substantially a result of magnetic transition and not any other effect, such as head degradation. The thermal decay characterizer 710 initializes a test track 740 once during a performance of the means 710. The test track 740 is initialized from test data 730 a first time that the test track 740 is used during a performance of the means 710 because the test track 740 is used to determine the thermal decay during a relatively long period of time of performance of the means 710. Moreover, in thermal decay, magnetic dipole relaxation within a magnetic transition causes the signal of the written test data 730 to weaken, and thus the time-domain ESNR and ESTDR measurements of the written test data 730 weakens. When contrary to the teachings of the present invention, the test track 740 is regularly and/or frequently written, each writing would reset a weakened state of a signal to a stronger state, thus preventing determination of thermal decay of the test data during a relatively long period of time. According to the teachings of the present invention, the reference track 770 is regularly rewritten with test data 760, which resets a weakened state in the reference track 770 to a stronger state, providing a reference of comparison to the test track 740. Thus, the present invention ensures that the measurement of thermal decay of time-domain ESNR data 780 and/or ESTDR data 790 on the test track 740 results substantially from magnetic transition and not any other effect, such as head degradation.

Apparatus 700 provides the advantage of measuring thermal decay of time-domain ESNR data 180 on the test track 140 that is substantially a result of magnetic transition and not any other effect, such as head degradation. Time-domain ESNR is closely correlated to bit-error-rate (BER). An ESNR measurement can be performed much faster than BER measurement. The speed of the test is well-suited for thermal decay measurement as it is advantageous to obtain data quickly after the first write is performed. In some embodiments, apparatus 700 uses an ESTDR measurement, that advantageously provides total signal distortion, linear and non-linear distortion, data of the signal measured under thermal influence.

Apparatus 700 also provides the advantage of not requiring an external measurement instrument attached to the disc drive. Because the processor includes the thermal decay characterization means 110, the disc drive is capable of extracting and calculating time-domain ESNR and ESTDR through firmware. This not only saves cost, it also allows certifying a design of drives without requiring costly external measurement instrument, such as a digital storage oscilloscope (DSO). In some embodiments, the only external apparatus required in the present invention is a temperature chamber to encase the apparatus 700 to provide thermal isolation to the systems 100.

Components of apparatus 700 can be embodied as computer hardware circuitry or as a computer-readable program, or a combination of both. In particular, the track selector 745 and the phase selector 725 can be embodied as computer hardware circuitry or as a computer-readable program, or a combination of both. More specifically, in the computer-readable program embodiment, the programs can be structured in an object-orientation using an object-oriented language such as Java, Smalltalk or C++, and the programs can be structured in a procedural-orientation using a procedural language such as C or assembly language. The software components communicate in any of a number of means that are well-known to those skilled in the art, such as application program interfaces (API.) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI).

Figure 8:
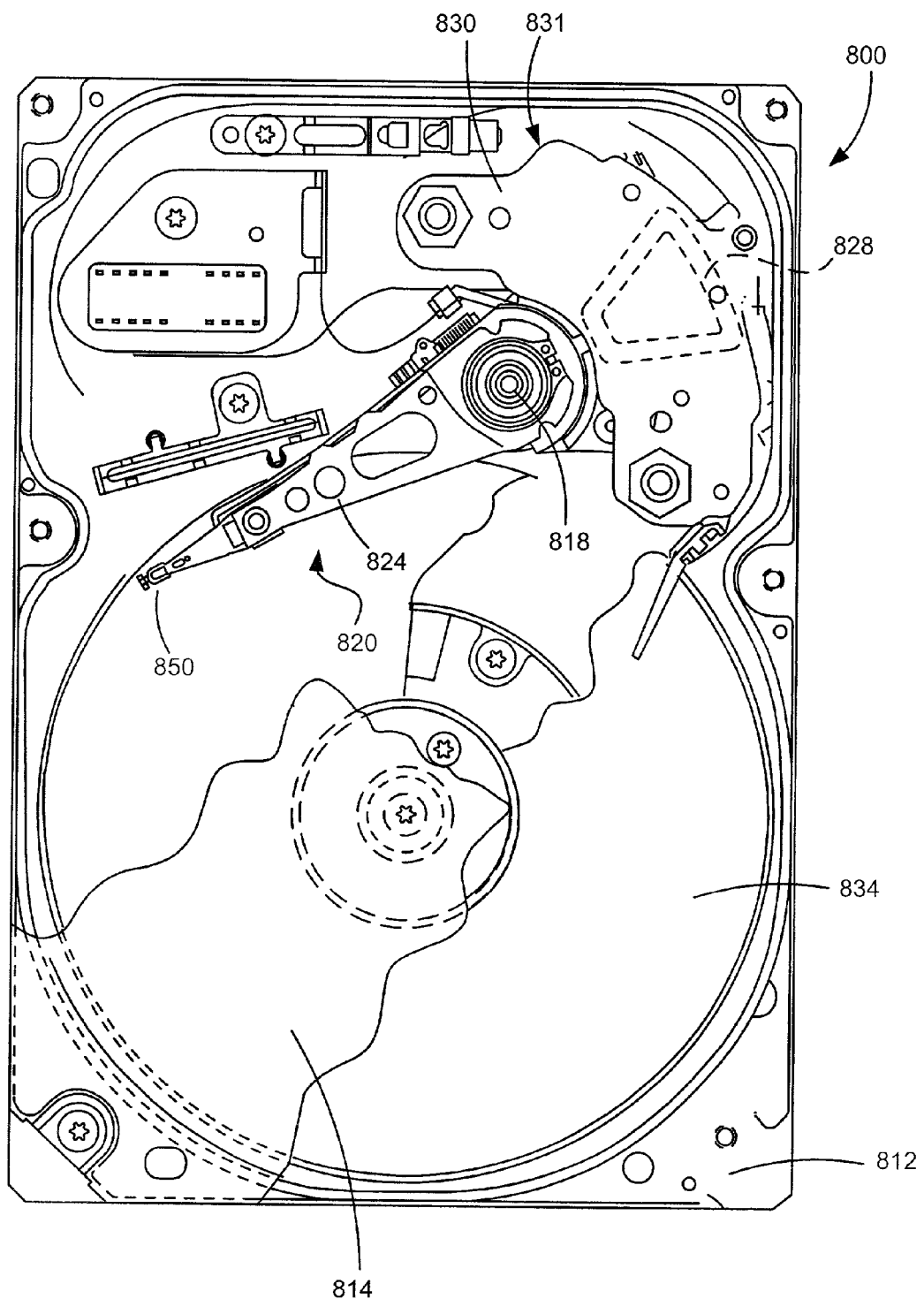
FIG. 8 is an exploded view of one embodiment of a disc drive of the present invention.

FIG. 8 is an exploded view of one embodiment of a disc drive of the present invention, this embodiment showing one type of magnetic disc drive 800 having a rotary actuator. The disc drive 800 is one example of magnetic disc drive devices, such as compact disc (CDROM) devices, tape cartridge devices, digital versatile disc (DVD) or digital video disc (DVD) devices. Other embodiments include other configurations and data recording and/or reading technologies. The disc drive 800 includes a housing or base 812, and a cover 814. The base 812 and cover 814 form a disc enclosure. Rotatably attached to the base 812 on an actuator shaft 818 is an actuator assembly 820. The actuator assembly 820 includes a plurality of arms with load beams or load springs 824. Load beams or load springs are also referred to as suspensions. Attached at the end of each load spring 824 is a slider, which carries a magnetic transducer 850. In some embodiments, transducer 850 includes an electromagnetic coil write head and a magneto-resistive read head. The slider with the transducer 850 form what is often called the head. It should be noted that many sliders have one transducer 850 and that is what is shown in the figures. It should also be noted that this invention is equally applicable to sliders having more than one transducer, such as what is referred to as an MR or magneto resistive head in which one transducer 850 is generally used for reading and another is generally used for writing. On the end of the actuator assembly 820 opposite the load springs 824 and the sliders 826 is a voice coil 828.

Attached within the base 812 is a first magnet 830 and a second magnet 831. The first and second magnets 830, 831, and the voice coil 828 are the key components of a voice coil motor which applies a force to the actuator assembly 820 to rotate it about the actuator shaft 818. Also mounted to the base 812 is a spindle motor. The spindle motor includes a rotating portion called a spindle hub. In FIG. 8, a number of discs 834 (one or more) are attached to the spindle hub to form disc assembly. In other disc drives, a single disc or a different number of discs may be attached to the hub.

FIG. 9 is a high-level block diagram showing the main data paths in a conventional high-level disc drive architecture 900 for a typical disc drive system 800. Only the main data paths between the host interface 921 and the disc media 834 are shown, and only the system's main components relevant to the invention are depicted.

One disc 834 is shown, having transducer (read/write head) 850 transferring data between the disc surface 850 and pre-amplifier (preamp) 910. Write data 913 is transferred from circuit 912 to preamp 910 for write operations, based on write NRZ (non-return-to-zero) data 915 and NRZ clock 917. Analog read data is transferred from preamp 910 to the recovery circuits of read channel 912, which provides NRZ read data 918 and NRZ read clock 919 (also called the "byte clock") to disc controller 914. Data is transferred to and from main buffer memory 916 of the disc drive across buffer interface 920.

The read channel circuitry 912 provides a byte clock 919 to the disc controller 914, matching the disc data rate both during read and write events and during idle periods when no data is being transferred to or from the media.

Disc controller 914 is the heart of the disc drive from a data transfer management perspective. During disc reads, for example, it controls read channel 912 to locate the appropriate physical position of the data on the media and to transfer the data into disc controller 914, through data pipelines and FIFOs, and into main buffer memory 916. Disc controller 914 also typically includes logic to transfer the data from main buffer memory 916, through data pipelines and FIFOs, and across host interface 921. The subsystem within disc controller 914 that is responsible for controlling the data traffic into and out of main buffer memory 916 is referred to as the buffer controller.

Also, disc controller 914 typically includes ECC encoder and decoder logic to protect the integrity of the data stored on the disc media and to correct relatively small errors in the data which result from imperfect disc media and from an imperfect read channel 912. This error correction function within the disc controller 914 typically requires functional support and bandwidth from the buffer controller to access main buffer memory 916.

In conclusion, systems, apparatus, and methods are disclosed through which the thermal decay of data recorded on a magnetic mass storage medium of a mass storage device is characterized. Method 300 includes writing reference data to a reference track and an adjacent track, on the magnetic mass storage medium of the mass storage device 310, writing test data to a test track on the magnetic mass storage medium of the mass storage device 320 and determining a time-domain equalized-signal-to-total-distortion ratio and an equalized signal-to-noise ratio from the test data and from the reference data 350.

An information handling system is also disclosed that includes a base 812, a magnetic disc 834 rotatably attached to the base 812, an actuator assembly 820 movably attached to the base 812, the actuator assembly 820 further comprising a voice coil 828 attached to the actuator assembly 820, a processor 100 operably coupled to the actuator 828, and a means 110 operative on the processor 100 to write test data 130 to a test track 140 on the disc 834 once during a performance of the means 110, to write test data 170 a plurality of times to a reference track 170 on the disc 834, and to measure the time-domain ESNR 180 and the ESTDR 190 of the test track 140 and the reference track 170, and to characterize the thermal decay of the disc from the time-domain ESNR 180 and the ESTDR 190.

A method of characterizing the thermal decay of data recorded on a magnetic mass storage medium of a mass storage device is disclosed, the method including reading 340 test data 130 from the magnetic mass storage medium 150 of the mass storage device, reading 330 reference data 170 from the magnetic mass storage medium 150 of the mass storage device, and determining 350 an equalized-signal-to-total-distortion ratio and the equalized signal-to-noise ratio from the read test data 340 and from the read reference data 170. The reading 340 further includes sampling 410 a plurality of digital signals of test data in a plurality of phases, yielding a plurality of test data digital samples, the plurality of test data digital signals being sampled through a non-return-to-zero bus 715 from a Viterbi Detector of a mass storage medium, and arranging 420 the plurality of test digital samples in chronological order. The reading step 330 further includes sampling 410 a plurality of digital signals of reference data in a plurality of phases, yielding a plurality of reference digital samples, the plurality of reference digital signals being sampled through a non-return-to-zero bus 715 from a Viterbi Detector of a mass storage medium, and arranging 420 the plurality of reference digital samples in chronological order.

A method of characterizing the thermal decay of data recorded on a magnetic mass storage medium of a mass storage device is disclosed, including sampling 410 a plurality of digital signals of read data in a plurality of phases, yielding a plurality of samples, the plurality of digital signals sampled from a Viterbi Detector of the mass storage medium through a non-return-to-zero bus 715, and arranging 420 the plurality of digital samples in chronological order. The sampling step 410 is repeatedly performed in a plurality of performances during a predetermined time period 765, including a delay of a predetermined time 755 between each of the plurality of performances. The method includes setting 510 the quantity of sampling phases, and reading 520 the read data for each of the sampling phases as many times as the quantity of sampling phases. The reading includes setting 610 a sample phase to an initial sample phase, reading 620 the read data of the sample phase as many times as the sampling, determining 630 whether or not the sample phase is a last sample phase, and setting 640 the sample phase to a next sample phase, if the determining 630 indicates that the sample phase is not the last sample phase. The method is performed on a prototype of a mass storage device during a design stage of the development of the mass storage device, or on a production unit of a mass storage device produced during a production stage of the mass storage device, wherein the production unit is a sample of plurality of mass storage devices produced during a production stage.

A disc drive device is disclosed that includes a base 812, a disc 834 rotatably attached to the base 812, to store test data and reference data, an actuator assembly 820 movably attached to the base 812 the actuator assembly 820 further comprising a voice coil 828 attached to the actuator assembly 820, a non-return-to-zero bus 715, operably coupled to the disc 834, and a disc drive controller 920, communicatively coupled to the actuator 820 and to the non-return-to-zero bus 715, which further includes: a phase selector 725, to select a phase of data to be read from the non-return-to-zero bus 715. The disc 834 includes a disc 834 rotatably attached to the base 812, to store pseudo-random 127-bit pattern 730 and 760. The disc drive device includes a magnetic disc drive 800.

An information handling system is disclosed that includes a base 812, a magnetic disc 834 rotatably attached to the base 812, an actuator assembly 820 movably attached to the base 812 the actuator assembly 820 further comprising a voice coil 828 attached to the actuator assembly 820, and a processor 720 operably coupled to the actuator, the processor 720 includes a disc thermal decay characterizer 710. The disc thermal decay characterizer 710 further comprises a track list 735, having a plurality of representations of one or more addresses of associated test and reference portions on the magnetic disc 834, wherein the track list 735 includes at least one representation of a reference track 770 and a least one representation of a test track 740, and a track selector 745 operably coupled to the track list 735, to traverse the track list 735, to obtain the representations from the track list 735, and to transmit test data 730 and reference data 760 to the magnetic disc 834. The disc thermal decay characterizer 710 further comprises a representation of a time delay 755, and the track selector 745 further comprises a track selector 745 operably coupled to the track list 734, and to the representation of a time delay 755, to traverse the track list 735, to obtain the representations from the track list 735, and to transmit test data 730 and reference data 760 to the magnetic disc 834 in reference to the representation of a time delay 755. The disc thermal decay characterizer 710 includes a representation of a stop time 765, and the track selector 745 further comprises a track selector 745 operably coupled to the track list 735, and to the representation of a stop time 765, to traverse the track list 735, to obtain the representations from the track list 735, and to transmit test data 730 and reference data 760 to the magnetic disc 834 in reference to the representation of a stop time 765.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the widget while maintaining substantially the same functionality without departing from the scope and spirit of the present invention. In addition, although the preferred embodiment described herein is directed to a widget for a widget system, it will be appreciated by those skilled in the art that the teachings of the present invention can be applied to other systems, like gadget or thingamajig systems, without departing from the scope and spirit of the present invention.

We claim:

1. A method, comprising:
    sampling test data from a magnetic mass storage medium;
    sampling reference data from the magnetic mass storage medium; and
    characterizing thermal decay of the magnetic mass storage medium based on at least one of the sampled test data and the sampled reference data;
    wherein at least one of the test data and the reference data are sampled in a plurality of phases.

2. The method of claim 1, wherein retrieving reference data comprises retrieving reference data from:
    a reference track and an adjacent track on the magnetic mass storage medium.

3. The method of claim 1, wherein retrieving test data comprises retrieving test data from:
    a test track on the magnetic mass storage medium.

4. The method of claim 1, wherein retrieving the reference data is performed after retrieving the test data.

5. The method of claim 1, wherein the test data is sampled through a non-return-to-zero bus from a Viterbi Detector of the mass storage medium.

6. The method of claim 1, wherein the reference data is sampled through a non-return-to-zero bus from a Viterbi Detector of the mass storage medium.

7. The method of claim 6, further comprising arranging the plurality of reference digital samples in chronological order.

8. The method of claim 5, further comprising arranging the test data digital samples in chronological order.

9. The method of claim 1, wherein retrieving reference data comprises retrieving a pseudo-random bit pattern of reference data.

10. The method of claim 1, wherein retrieving test data comprises retrieving a pseudo-random bit pattern of test data.

11. The method of claim 1, wherein
    characterizing thermal decay comprises determining an equalized signal-to-noise distortion ratio from the test data and from the reference data.

12. The method of claim 1, wherein
    characterizing thermal decay comprises determining an equalized signal-to-noise ratio from the test data and from the reference data.

13. A system, comprising:
    a magnetic data storage medium; and
    a processor that retrieves test data from the magnetic data storage medium and retrieves reference data from the magnetic data storage medium, wherein at least one of the test data and the reference data is retrieved at a plurality of phases, and wherein the processor characterizes thermal decay of the magnetic data storage medium based on the test data and the reference data.

14. The system of claim 13, wherein the processor further retrieves test data from a test track of the magnetic data storage medium.

15. The system of claim 13, wherein the processor further retrieves reference data from a reference track of the magnetic data storage medium.

16. The system of claim 13, wherein the processor further retrieves reference data from a reference track and an adjacent track of the magnetic data storage medium.

17. The system of claim 13, wherein the processor samples a plurality of digital signals of test data and reference data in a plurality of phases, yielding a plurality of test digital samples and reference digital samples.

18. The system of claim 17, wherein the processor samples the plurality of digital signals of test data and reference data via a non-return-to-zero bus from a Viterbi Detector of the magnetic data storage medium.

19. The system of claim 17, wherein the processor arranges the test digital samples in chronological order.

20. The system of claim 13, wherein the processor retrieves a pseudo-random bit pattern of reference data.

21. The system of claim 13, wherein the processor retrieves a pseudo-random bit pattern of test data.

22. The system of claim 13, wherein the processor determines an equalized signal-to-total-distortion ratio from the test data and from the reference data and characterizes the thermal decay of the magnetic data storage medium based on the equalized signal-to-noise-distortion ratio.

23. The system of claim 13, wherein the processor determines an equalized signal-to-noise ratio from the test data and from the reference data and characterizes the thermal decay of the magnetic data storage medium based on the equalized signal-to-noise ratio.

* * * * *

UNITED STATES PATENT AND TRADEMARK OFFICE
CERTIFICATE OF CORRECTION

PATENT NO. : 7,209,304 B2
APPLICATION NO. : 10/172515
DATED : April 24, 2007
INVENTOR(S) : Edmun Chian Song Seng and UttHeng Kan It is certified that error appears in the above-identified patent and that said Letters Patent is hereby corrected as shown below:

Title page item [56] under REFERENCES CITED, add --6,841,169 01/2005 Leonardos et al.--

Col. 7, Line 64, "$\sqrt{\sum_{m\in N}^{M\ N}} \{ \{ a_{mn} \text{ and } H_{mn} \, a_{mn} \, \overline{a_{mn}},$ where
$H_{mn}$ sampling error;
$a_{mn}$ ADC sample output; and $\overline{a_{mn}}$ Ideal Target Sample
Then $$\xi^2_{MSE} \frac{1}{MN} \sum_{m}^{M} \sum_{n}^{N} \{ \{ \leftrightarrow H^2_{mn} \; \spadesuit \; \frac{1}{MN} \sum_{m}^{M} \sum_{n}^{N} \{ \{ H_{mn} \div \approx \; \approx \; \ldots$$ ,,

UNITED STATES PATENT AND TRADEMARK OFFICE
CERTIFICATE OF CORRECTION

PATENT NO. : 7,209,304 B2  Page 2 of 5
APPLICATION NO. : 10/172515
DATED : April 24, 2007
INVENTOR(S) : Edmun Chian Song Seng and UttHeng Kan It is certified that error appears in the above-identified patent and that said Letters Patent is hereby corrected as shown below:

should be $$-- V = \sum_{m=1}^{M} \sum_{n=1}^{N} a_{mn} \text{ and } \varepsilon_{mn} = a_{mn} - \overline{a_{mn}}$$

where $\varepsilon_{mn}$ = sampling error;

$a_{mn}$ = ADC sample output; and $\overline{a_{mn}}$ = Ideal Target Sample

Then $$\sigma_{MSE}^2 = \frac{1}{MN} \sum_{m=1}^{M} \sum_{n=1}^{N} \left[ \varepsilon_{mn}^2 - \left( \frac{1}{MN} \sum_{m=1}^{M} \sum_{n=1}^{N} \varepsilon_{mn} \right)^2 \right] --$$

Col. 8, Line 29, " $\zeta_{MSE}^2$ $\zeta_{Noise}^2$ $\zeta_{NLD}^2$, with $$\zeta_{Noise}^2 = \frac{1}{N} \left\{ \sum_{n=1}^{N} \left[ \frac{1}{M} \sum_{m=1}^{M} H_{mn}^2 \right] - \left[ \frac{1}{M} \sum_{m=1}^{M} H_{mn} \right]^2 \right\},$$

$$\zeta_{NLD}^2 = \frac{1}{N} \left\{ \sum_{n=1}^{N} \left[ \frac{1}{M} \sum_{m=1}^{M} H_{mn} \right]^2 \right\} - \left\{ \frac{1}{N} \sum_{n=1}^{N} \left[ \frac{1}{M} \sum_{m=1}^{M} H_{mn} \right] \right\}^2$$

"

UNITED STATES PATENT AND TRADEMARK OFFICE
CERTIFICATE OF CORRECTION

PATENT NO.      : 7,209,304 B2
APPLICATION NO. : 10/172515
DATED           : April 24, 2007
INVENTOR(S)     : Edmun Chian Song Seng and UttHeng Kan It is certified that error appears in the above-identified patent and that said Letters Patent is hereby corrected as shown below:

should be --

$$\sigma_{MSE}^2 = \sigma_{Noise}^2 + \sigma_{NLD}^2,$$

$$\sigma_{Noise}^2 = \frac{1}{N}\sum_{n=1}^{N}\left(\frac{1}{M}\sum_{m=1}^{M}\varepsilon_{mn}^2 - \left(\frac{1}{M}\sum_{m=1}^{M}\varepsilon_{mn}\right)^2\right),$$

$$\sigma_{NLD}^2 = \frac{1}{N}\sum_{n=1}^{N}\left(\frac{1}{M}\sum_{m=1}^{M}\varepsilon_{mn}\right)^2 - \left(\frac{1}{N}\sum_{n=1}^{N}\left(\frac{1}{M}\sum_{m=1}^{M}\varepsilon_{mn}\right)\right)^2 \quad --$$

Col. 8, Line 47, "

$$ESNR\ 20*\log\frac{S_{EPR4sample}}{Noise_{PRSrms}}$$

$$20*\log\frac{S_{PRSrms}}{Noise_{PRSrms}}\ 10*\log\frac{N}{N1}$$

$$\frac{S_{EPR4sample}}{S_{PRSrms}}\ \sqrt{\frac{N}{N1}},\ \text{where}\ N = PRS\ \text{Length}$$

$$S_{PRSrms}\ SignalEPR4$$

"

should be --

$$ENSR = 20*\log\frac{S_{EPR4sample}}{Noise_{PRSrms}}$$

$$= 20*\log\frac{S_{PRSrms}}{Noise_{PRSrms}} + 10*\log\frac{N}{N+1}$$

$$\frac{S_{EPR4sample}}{S_{PRSrms}} = \sqrt{\frac{N}{N+1}},\ \text{where}\ N = PRS\ \text{Length}$$

$$S_{PRSrms} = SignalEPR4$$

--

UNITED STATES PATENT AND TRADEMARK OFFICE
CERTIFICATE OF CORRECTION

PATENT NO. : 7,209,304 B2
APPLICATION NO. : 10/172515
DATED : April 24, 2007
INVENTOR(S) : Edmun Chian Song Seng and UttHeng Kan It is certified that error appears in the above-identified patent and that said Letters Patent is hereby corrected as shown below:

Col. 8, Line 58, "
$$ESNR_{rmse}\ 20*\log\left(\frac{SignalEPR4^2}{\zeta_{MSE}}\right)$$

$$ESNR_{noise}\ 20*\log\left(\frac{SignalEPR4^2}{\zeta_{Noise}}\right)$$

$$ESTDR\ 20*\log\left(\frac{SignalEPR4^2}{\zeta_{NLD}}\right)$$
"

should be --
$$ENSR_{rmse} = 20*\log\left(\frac{SignalEPR4^2}{\sigma_{MSE}^2}\right)$$

$$ENSR_{noise} = 20*\log\left(\frac{SignalEPR4^2}{\sigma_{NLD}^2}\right)$$

$$ESTDR = 20*\log\left(\frac{SignalEPR4^2}{\sigma_{NLD}^2}\right)$$
--

UNITED STATES PATENT AND TRADEMARK OFFICE
CERTIFICATE OF CORRECTION

PATENT NO. : 7,209,304 B2
APPLICATION NO. : 10/172515
DATED : April 24, 2007
INVENTOR(S) : Edmun Chian Song Seng and UttHeng Kan It is certified that error appears in the above-identified patent and that said Letters Patent is hereby corrected as shown below:

Col. 11, Line 63, "{1, 9, 20 17, 2, 10, 18, 3, 11, 19, 4, 12, 20, 5, 13, 21," should be --{1, 9, 17, 2, 10, 18, 3, 11, 19, 4, 12, 20, 5, 13, 21,--

Signed and Sealed this

Fourth Day of November, 2008

JON W. DUDAS
*Director of the United States Patent and Trademark Office*